(12) United States Patent
Boroughs et al.

(10) Patent No.: US 11,941,878 B2
(45) Date of Patent: Mar. 26, 2024

(54) AUTOMATED COMPUTER SYSTEM AND METHOD OF ROAD NETWORK EXTRACTION FROM REMOTE SENSING IMAGES USING VEHICLE MOTION DETECTION TO SEED SPECTRAL CLASSIFICATION

(71) Applicant: Raytheon Company, Tewksbury, MA (US)

(72) Inventors: Grant B. Boroughs, Southlake, TX (US); John J. Coogan, Bedford, TX (US); Lisa A. McCoy, Springfield, VA (US)

(73) Assignee: Raytheon Company, Tewksbury, MA (US)

( * ) Notice: Subject to any disclaimer, the term of this patent is extended or adjusted under 35 U.S.C. 154(b) by 292 days.

(21) Appl. No.: 17/358,850

(22) Filed: Jun. 25, 2021

(65) Prior Publication Data
US 2022/0414376 A1    Dec. 29, 2022

(51) Int. Cl.
*G06V 20/58*        (2022.01)
*G06V 10/75*        (2022.01)
(Continued)

(52) U.S. Cl.
CPC .......... *G06V 20/182* (2022.01); *G06V 10/751* (2022.01); *G06V 20/176* (2022.01);
(Continued)

(58) Field of Classification Search
CPC .... G06V 20/182; G06V 20/584; G06V 20/58; G06V 20/588; G06V 20/10; G06V 20/13;
(Continued)

(56) References Cited

U.S. PATENT DOCUMENTS 5,550,937 A   8/1996  Bell et al.
5,640,200 A   6/1997  Michael
(Continued)

FOREIGN PATENT DOCUMENTS

WO   WO-2022271963 A1   12/2022
WO   WO-2023287982 A1   1/2023

OTHER PUBLICATIONS

Agar et al. "Geopositional accuracy evaluation of QuickBird ortho-ready standard 2A multispectral imagery." Algorithms and Technologies for Multispectral, Hyperspectral, and Ultraspectral Imagery X. vol. 5425. SPIE (Year: 2004).*
(Continued)

*Primary Examiner* — Sumati Lefkowitz
*Assistant Examiner* — Michael Adam Shariff
(74) *Attorney, Agent, or Firm* — Schwegman Lundberg & Woessner, P.A.

(57) ABSTRACT

A fully-automated computer-implemented system and method for generating a road network map from a remote sensing (RS) image in which the classification accuracy is satisfactory combines moving vehicle detection with spectral classification to overcome the limitations of each. Moving vehicle detections from an RS image are used as seeds to extract and characterize image-specific spectral roadway signatures from the same RS image. The RS image is then searched and the signatures matched against the scene to grow a road network map. The entire process can be performed using the radiance measurements of the scene without having to perform the complicated geometric and atmospheric conversions, thus improving computational efficiency, the accuracy of moving vehicle detection (location, speed, heading) and ultimately classification accuracy.

19 Claims, 13 Drawing Sheets

(51) Int. Cl.
*G06V 20/10* (2022.01)
*G06V 10/58* (2022.01)

(52) U.S. Cl.
CPC ............ *G06V 20/584* (2022.01); *G06V 10/58* (2022.01); *G06V 20/194* (2022.01)

(58) Field of Classification Search
CPC .... G06V 20/176; G06V 20/194; G06V 10/58; G06V 10/751
See application file for complete search history.

(56) References Cited

U.S. PATENT DOCUMENTS

| | | | |
|---|---|---|---|
| 5,724,496 | A | 3/1998 | Givens et al. |
| 6,483,538 | B2 | 11/2002 | Hu |
| 7,787,655 | B1 | 8/2010 | Cohen |
| 7,970,170 | B2 | 6/2011 | Tener et al. |
| 8,155,452 | B2 | 4/2012 | Minear |
| 8,290,305 | B2 | 10/2012 | Minear et al. |
| 9,165,361 | B1 | 10/2015 | Ely |
| 10,460,458 | B1 | 10/2019 | Vakil et al. |
| 2002/0159651 | A1 | 10/2002 | Tener et al. |
| 2003/0026458 | A1 | 2/2003 | Nahum |
| 2004/0005082 | A1 | 1/2004 | Lee et al. |
| 2004/0131281 | A1 | 7/2004 | Reiners |
| 2008/0002878 | A1 | 1/2008 | Meiyappan |
| 2008/0095407 | A1 | 4/2008 | Stewart et al. |
| 2008/0165359 | A1 | 7/2008 | Mattox et al. |
| 2008/0199078 | A1 | 8/2008 | Lam et al. |
| 2009/0304288 | A1 | 12/2009 | Rohaly |
| 2010/0232728 | A1 | 9/2010 | Leprince et al. |
| 2011/0293146 | A1 | 12/2011 | Grycewicz |
| 2012/0098986 | A1 | 4/2012 | Robertson et al. |
| 2014/0111511 | A1 | 4/2014 | Raif |
| 2014/0112536 | A1 | 4/2014 | Ely et al. |
| 2016/0188559 | A1 | 6/2016 | Maltz |
| 2018/0089843 | A1 | 3/2018 | Miecznik |
| 2019/0150206 | A1* | 5/2019 | Su .................... H04W 76/10 370/328 |
| 2020/0020072 | A1 | 1/2020 | Ely |
| 2020/0020115 | A1 | 1/2020 | Ely |
| 2020/0043134 | A1 | 2/2020 | Martin et al. |
| 2021/0150206 | A1 | 5/2021 | Bader |
| 2023/0016764 | A1 | 1/2023 | Boroughs |

OTHER PUBLICATIONS

"U.S. Appl. No. 17/378,113, Non Final Office Action dated Mar. 27, 2023", 15 pgs.
"U.S. Appl. No. 17/378,113, Response filed Apr. 21, 2023 to Non Final Office Action dated Mar. 27, 2023", 14 pgs.
"International Application Serial No. PCT/US2022/034750, International Search Report dated Oct. 7, 2022", 5 pgs.
"International Application Serial No. PCT/US2022/034750, Written Opinion dated Oct. 7, 2022", 7 pgs.
"International Application Serial No. PCT/US2022/037131, International Search Report dated Nov. 18, 2022", 4 pgs.
"International Application Serial No. PCT/US2022/037131, Written Opinion dated Nov. 18, 2022", 6 pgs.
Ager, Thomas P, et al., "Geopositional accuracy evaluation of QuickBird ortho-ready standard 2A multispectral imagery", SPIE Smart Structures and Materials + Nondestructive Evaluation and Health Monitoring, 2005, San Diego, California, United States, vol. 5425, (Aug. 12, 2004), 488.
Feng, Gao, et al., "Moving Vehicle Information Extraction from Single-Pass WorldView-2 Imagery Based on ERGAS-SNS Analysis", Remote Sensing, vol. 6, No. 7, (Jul. 16, 2014), 6500-6523.
Jordan, M, "High resolution stereo parallax determination using a neural network", Proceedings of SPIE, IEEE, US, vol. 1076, (Jan. 17, 1989), 123-130.
Scheffler, Daniel, et al., "AROSICS: An Automated and Robust Open-Source Image Co-Registration Software for Multi-Sensor Satellite Data", Remote Sensing, vol. 9, No. 7, (Jul. 1, 2017), 676.
Wen, Liu, et al., "Automated Vehicle Extraction and Speed Determination From QuickBird Satellite Images", IEEE Journal of Selected Topics in Applied Earth Observations and Remote Sensing, IEEE, USA, vol. 4, No. 1, (Mar. 1, 2011), 75-82.
Bresnahan, Paul, et al., "WorldView-3 Geolocation Accuracy and Band Co-Registration Analysis", 2016 Joint Agency Commercial Imagery Evaluation (JACIE) Workshop, 45 pgs.
Kaab, Andreas, "Vehicle Velocity From WorldView-2 Satellite Imagery", IEEE Geoscience and Remote Sensing Society (GRSS) Data Fusion Contest, (2011), 4 pgs.
Marchesi, Andrea, et al., "Detection of Moving Vehicles With WorldView-2 Satellite Data", The 33rd Asian Conference on Remote Sensing, (Nov. 2012), 9 pgs.
Salehi, Bahram, et al., "Automatic Moving Vehicles Information Extraction From Single-Pass WorldView-2 Imagery", IEEE Journal of Selected Topics in Applied Earth Observations and Remote Sensing, vol. 5, No. 1, (Feb. 2012), 135-145.
Sampath, Ajit, et al., "RCA-EO JACIE Satellite Sensor Characterization Methods", JACIE 2018, (Sep. 17, 2018), 25 pgs.
Tao, Jianwei, et al., "A Preliminary Study on Imaging Time Difference Among Bands of Worldview-2 and Its Potential Applications", Joint Agency Commercial Imagery Evaluation Civil Commercial Imagery Evaluation Workshop, Boulder, Colorado, (Mar. 30, 2011), 20 pgs.
Wang, Weixing, et al., "A review of road extraction from remote sensing images", Journal of Traffic and Transportation Engineering (English Edition) 2016; 3(3), (May 17, 2016), 271-282.
Xiong, Zhen, et al., "An Initial Study on Vehicle Information Extraction from Single Pass QuickBird Satellite Imagery", Photogrammetric Engineering & Remote Sensing, vol. 74, No. 11, (Nov. 2008), 1401-1411.
"U.S. Appl. No. 17/378,113, Final Office Action dated Jun. 9, 2023", 16 pgs.
"U.S. Appl. No. 17/378,113, Non Final Office Action dated Aug. 22, 2023", 11 pgs.
"U.S. Appl. No. 17/378,113, Response filed Aug. 2, 2023 to Final Office Action dated Jun. 9, 2023", 15 pgs.
"U.S. Appl. No. 17/378,113, Response filed Aug. 30, 2023 to Non Final Office Action dated Aug. 22, 2023", 13 pgs.

* cited by examiner

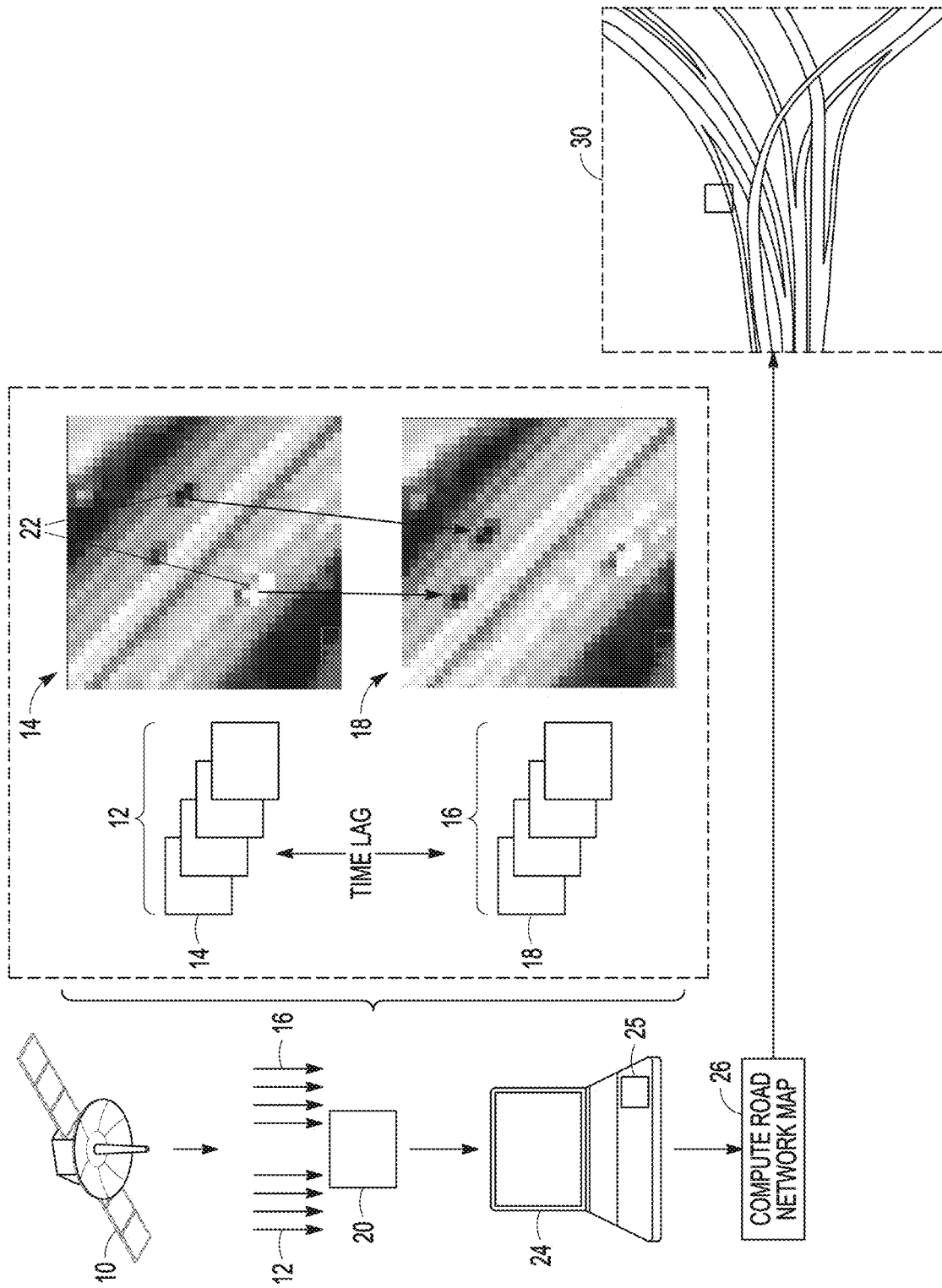

AUTOMATED COMPUTER SYSTEM AND METHOD OF ROAD NETWORK EXTRACTION FROM REMOTE SENSING IMAGES USING VEHICLE MOTION DETECTION TO SEED SPECTRAL CLASSIFICATION

GOVERNMENT LICENSE RIGHTS

This disclosure was made with government support under HM0476-17-D-0015. The government has certain rights in this invention.

BACKGROUND

Field

This disclosure relates to the extraction of road networks from remote sensing images, and more particularly to an automated system and method using vehicle motion detection to seed spectral classification.

Description of the Related Art

As a significant role for traffic management, city planning, road monitoring, GPS navigation and map updating, the technology of road network extraction from a remote sensing (RS) image has been a topic of considerable attention as described by Weixing Wang et. al., "A Review of Road Extraction from Remote Sensing Images," Journal of Traffic and Transportation Engineering (English Edition) 2016; 3(3); 271-282. High resolution RS images such as IKonos, QuickBird, WorldView and GeoEye provide access to newly acquired high resolution geographic information. The difficulties of road extraction from RS images lie in the image characteristics of road features such as geometric, photometric, topological, functional and texture features can be affected by sensor type, spectral and spatial resolution, weather, light variation, ground characteristics, etc.

Road extraction methods include classification-based, knowledge-based, mathematical morphology, active contour model, dynamic programming and other models. Classification-based methods usually use the geometric, photometric and texture features of a road. The classification accuracy is far from satisfactory because of misclassification between road and other spectrally similar objects such as building blocks, field blocks, water areas, parking lots, etc. Supervised classification methods rely on a human analyst to select and label training samples in the RS image. To a large extent, the accuracy of the supervised classifier relies on the analyst's ability to properly select and accurately label the samples. Supervised classifiers include artificial neural network (ANN), support vector machine (SVM), Markov random fields (MRFs) classifier and maximum likelihood (ML) classifier. Unsupervised classification methods do not require training samples but overall accuracy suffers. Unsupervised classifiers are often used in knowledge discovery, parameter determination, characteristic analysis and other preprocessing steps and commonly including various clustering algorithms e.g., K-means, spectral clustering, mean shift, graph theory, etc.

A variant on the supervised classifier is to build a library of spectral roadway signatures from training data (e.g. representative RS images that include varying types of roadways and other features). An analyst selects and labels the training samples to build one or more signatures for different types of roadways e.g., concrete, asphalt, gravel, dirt, etc. The supervised classifier than searches a particular RS image trying to match the spectral roadway signatures from the library. Because the signatures are built from training RS images and not the actual RS image that is processed, the RS training and actual images must be converted to account for factors such as the geometry of the RS image (e.g. angle and distance of the sensor), lighting conditions, atmosphere (e.g. cloud cover) etc. to convert the pixel values that measure the radiance of a scene into pixel values that measure the reflection of the scene. The library of signatures and the processing of the RS images is all done in the reflectance domain. In theory, removing the geometric and atmospheric should improve classification, however in practice the conversion algorithms are quite complicated and tend to reduce classification accuracy.

As described by Bahram Salehi et. al., "Automatic Moving Vehicles Information Extraction From Single-Pass WorldView-2 Imagery," IEEE JOURNAL OF SELECTED TOPICS IN APPLIED EARTH OBSERVATIONS AND REMOTE SENSING, VOL., NO. 1, FEBRUARY 2021, pp. 135-145 high population growth and therefore high growth in road traffic volume over the last decades has increased road traffic to its congestion level. Vehicle monitoring is one of the important issues for modeling and planning of traffic and transportation management for both terrestrial and maritime areas. Traditionally, traffic monitoring has been conducted using ground-based equipment such as radar systems and video cameras. Salehi discloses a framework for automatic extraction of moving vehicles and their velocities using single-pass WV2 that, as shown in FIG. 2, includes using object-based road extraction to restrict the search space for moving vehicle extraction to roads and exploiting the time lag in image collection between the Panchromatic (Pan) and multi-spectral (MS) sensors to detect moving vehicles. Salahei uses a semi-automatic object-based road extraction framework using the Cognition Network Language to extract the roads that restrict the search space. Salehi exploits the collection time lag using moving vehicle detection (enhancement) by applying change detection to all eight MS bands e.g., principal component analysis (PCA) and extracting the changes (moving vehicles) using the object-based classification.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a fully-automated computer-implemented system and method for generating a road network map from a remote sensing (RS) image in which the classification accuracy is satisfactory. This approach exploits a collection time lag between sets of band images in a multi-band image to detect moving vehicles with sub-pixel accuracy and low False Alarm (FA) rates. Pseudo-pan (short for pseudo-panchromatic) images are formed as weighted averages of the one or more band images in each set and processed to detect the moving vehicles. The detected moving vehicles include location and possibly speed and heading as well as corresponding uncertainties. Pixels adjacent the locations of the detected moving vehicles are extracted from the multi-band image to characterize image-specific spectral roadway signatures. In turn, the multi-band image is searched to match the signatures to the scene to grow a road network map.

The collection time lag is exploited by segmenting a first pseudo-pan image into local template windows (N×N pixels) and correlating each local template window to a larger search window (M×M pixels) in the second pseudo-pan image to produce a correlation surface for each pixel (or group of pixels). The correlation may be performed as a standard correlation such as Normalized Cross Correlation (NCC) or Least Squares Correlation (LSC) using conventional cost functions or can be performed using a correlator tailored to moving vehicle detection in which central pixels are weighted more heavily and the cost function is exponentially weighted to emphasize moving features.

For each correlation, X and Y correlation offsets are extracted from each correlation surface (e.g. the offset of the correlation peak from 0,0) and thresholded to detect pixels (or small groups of pixels) that possibly correspond to moving vehicles. A Figure of Merit (FOM) is computed for each of the remaining correlation surfaces and those indicating a low detection confidence are removed. The accuracy of the FOM may be improved by first resampling the template window in the first pseudo-pan image or the search window in the second pseudo-pan image using the X and Y correlation offsets, and then correlating the local template window to the search window to produce a resampled correlation surface from which to compute the FOM. The FOM is an indicator of the quality (e.g., height or width) of the peak in the correlation surface. The FOM may be computed using known techniques such as a ratio of primary to secondary peak height or using an approach tailored to moving vehicle detection, which compensates for sub-pixel offsets when computing peak heights. Candidate moving vehicle pixels are then subject to various post-processing techniques to group the pixels, perform local contrast filtering to reject FAs or split vehicles, size rejection and erosion/dilation of the vehicles.

The image-specific spectral roadway signatures are extracted from pixel values adjacent the detected moving vehicles. The signature is suitably a measure of radiance from the scene as indicated by pixel values in each of the bands with an optional standard deviation for each band. Alternately, the signature could be represented in terms of reflection from the scene in each of the bands although this would require geometric and atmospheric conversions to compute and then use the signatures to grow the roadway. Typically, the spectral roadway signatures from all of the detected moving vehicles are clustered to identify a reduced number of image-specific spectral roadway signatures. The speed of the detected moving vehicles may be used in the clustering algorithm to separate similar but materially-distinct spectral clusters. Speed is not included as part of the signature during spectral matching, only during clustering. Furthermore, the image-specific spectral roadway signatures may be compared to a library of signatures for different classes of roadways (e.g., concrete, asphalt, gravel, dirt, etc.) in order to label each of the signatures.

The multi-band image is searched to match the image-specific spectral roadway signatures to pixel values in the image to grow the road network map. For each signature, the method selects a subset of pixels in the multi-band image (e.g., downsamples or aggregates into N×N windows), computes a spectral similarity metric to each pixel in the subset and thresholds the similarity metrics to create a binary roadway map. The threshold may be computed from similarity metrics throughout the entire image (or a database of similar imagery) or from similarity metrics for only pixels adjacent the detected moving vehicles in the image. The thresholds may be adapted based on comparisons of the width to known road widths or heading to known headings of the moving vehicles and reapplied to revise the binary roadway map. The binary roadway maps for each signature are then combined to generate the road network map. The speed and headings of the detected moving vehicles and labeled signatures may be used to label the road network map as to the type of road surface, direction of travel, and speed of travel.

In order to use time lag to detect moving vehicles the sets of band images in the multi-band image must otherwise be closely registered, typically within less than one pixel. The current sources of multi-band images satisfy this criteria. For reasons unknown, certain multi-band images that satisfy this overall criteria exhibit a sub-pixel misregistration that is correlated to the column number of the image, which was discovered via the localized image correlation used to detect moving vehicles. This structural misregistration may be measured and removed by, for each column in the pseudo-pan images, selecting a subset of rows and for each row in the subset performing a localized sub-pixel correlation (e.g., small window of N×N pixels) to produce X and Y sub-pixel correlation offsets between the pseudo-pan images. The X and Y sub-pixel correlation offsets are averaged over the column and used to interpolate pixel values from the pseudo-pan images to produce resampled pixels values for all rows in the column. The resampled pixels values are concatenated for all columns to form resampled pseudo-pan images. The subset of rows could include every row but that is not necessary to achieve accurate offset values and increases computational complexity. The resampled pseudo-pan images are input to the image correlator to detect moving vehicles. Each band of the multi-band image can be similarly resampled to produce a multi-band image in which this misregistration has been removed. This multi-band image can then be used for extraction of the spectral roadway signatures and to grow the road network map.

These and other features and advantages of the disclosure will be apparent to those skilled in the art from the following detailed description of preferred embodiments, taken together with the accompanying drawings, in which:

BRIEF DESCRIPTION OF THE DRAWINGS

FIGS. 1A-1B illustrate a fully-automated computer-implemented system and method of using moving vehicle detection from a multi-band image to extract spectral roadway signatures that are matched to the multi-band image to grow a road network map;

DETAILED DESCRIPTION

The present disclosure provides a fully-automated computer-implemented system and method for generating a road network map from a remote sensing (RS) image in which the classification accuracy is satisfactory. This approach combines moving vehicle detection with spectral classification to overcome the limitations of each. Moving vehicle detections from an RS image are used as seeds to extract and characterize image-specific spectral roadway signatures from the same RS image. The RS image is then searched and the signatures matched against the scene to grow a road network map. The entire process can be performed using the radiance measurements of the scene without having to perform the complicated geometric and atmospheric conversions, thus improving computational efficiency, the accuracy of moving vehicle detection (location, speed, heading) and ultimately classification accuracy.

The RS image is a multi-band image that includes first and second sets of band images that are collected with a time lag. For example, WorldView images, WV-2 or WV-3, are 8-band images. The first set includes Near-IR2 (860-1040 nm), Coastal Blue (400-450 nm), Yellow (585-625 nm) and Red-Edge (705-745 nm) and the second set includes Blue (450-510 nm), Green (520-580 nm), Red (630-690 nm) and Near-IR1 (770-895 nm). There is a time lag of 0.2-0.3 seconds between the collection of the band images in the first and second sets. Other multi-band images the exhibit a suitable time lag between at least two bands may be used. Without loss of generality, aspects of the computer-implemented system and method for generating a road network map will be described for a WV-2 8-band image.

Figure 1B:
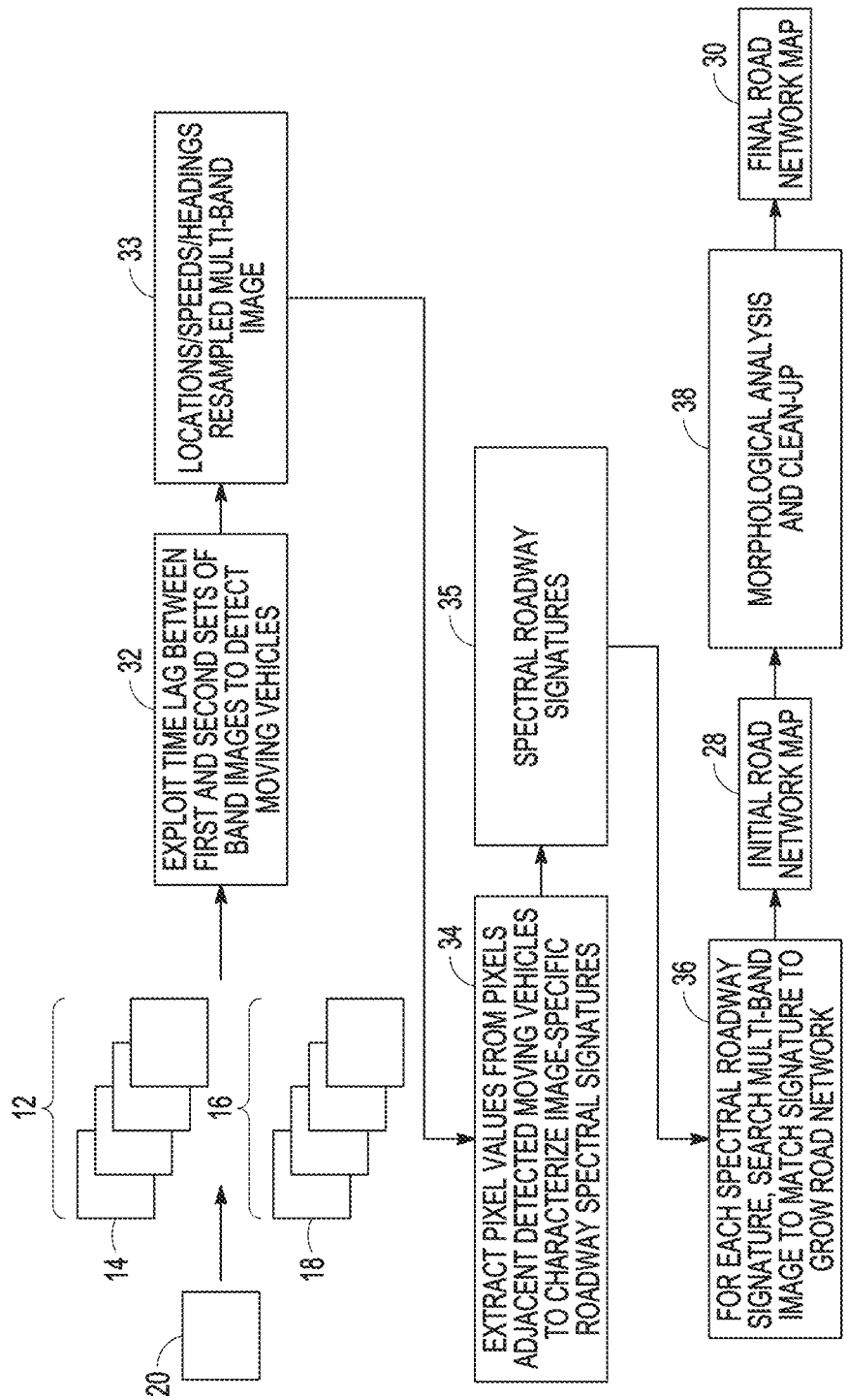

Referring now to FIGS. 1A-1B, a Multi-Spectral Imaging (MSI) satellite 10 collects a first set 12 of band images 14 (Near-IR2, Coastal Blue, Yellow and Red-Edge) and a second set 16 of band images 18 (Blue, Green, Red and Near-IR1) separated by a time lag that define a multi-band image 20. As shown, vehicles 22 have changed position against an otherwise static background from a band image 14 in the first set to a band image 18 in the second set due to the collection time lag. A computer 24 includes a non-transitory medium 25 (e.g. memory) that is programmed to process a single multi-band image 20 to compute an initial road network map 28 that is cleaned-up to produce a final road network map 30 (step 26). The final road network map 30 may be color coded or labeled to indicate the type of roadway (e.g., concrete, asphalt, gravel, dirt, etc.), the direction of traffic flow or the speed of traffic flow.

The computer-implemented system and method is configured exploit the time lag between the sets of band images to detect moving vehicles (step 32) and generate an output 33 including at least the location of each detected moving vehicles. The system may also generate and output the speed and heading of each moving vehicle. The system may also generate resampled band images that sub-pixel column misregistration to improve image quality for subsequent processing. The computer-implemented system and method is configured to extract pixel values from the multi-band image at pixels adjacent to the locations of detected moving vehicles to characterize at least one image-specific spectral roadway signature 35 (step 34). For example, the signature may be an average pixel value and an uncertainty measure (e.g. a standard deviation) for each of the 8 bands. The pixel values may represent the radiance of the scene measured by the band images. Alternately, the multi-band images could be processed to perform geometric and atmospheric conversions such that the pixel values represent reflectance of the scene. The computer-implemented system and method is configured to search the multi-band image to match each of the image-specific spectral roadway signatures to pixel values in the scene (radiance) or representative of the scene (reflectance) to grow a road network map (step 36). The union of the initial searches for each of the signatures provides the initial road network map 28. The computer-implemented system and method are configured to apply morphological analysis and clean-up (step 38) to output the final road network map 30.

Moving Vehicle Detection Referring now to FIGS. 2, 3A-3C, 4, 5 and 6, in an embodiment to exploit the time lag between the first and second sets 12 and 16 of band images 14 and 18 to detect moving vehicles, the computer-implemented system and method are configured to condition the band images (step 40) for subsequent processing, perform a localized sub-pixel image correlation (step 42) to identify candidate moving vehicle pixels and process the candidate moving vehicle pixels to clean up and output the detected moving vehicles (step 44).

To condition the band images, the computer-implemented system forms first and second "pseudo-pan" images (e.g., average grayscale images) from the first and second sets 12 and 16 of band images 14 and 18 (step 46). Because each band has its own spectral response, the same feature will have different intensities in different bands, so in order to make the correlation processing more accurate, it is helpful to balance the intensities of the pseudo-pan images. The computer-implemented system is configured to perform a least-squares intensity matching for the pseudo-pan images (step 48) in which one image is the simple average of its bands and the other image uses a least squares approach to solve for a gain $g_i$ for each band and a total offset c that best matches the first pseudo-pan image value.

$$g_1 b_1 + g_2 b_2 + \ldots + g_n b_n + c = p \quad \text{(eq. 1)}$$

To balance the two grayscale images, an observation matrix is constructed using the band values for each pixel of Image B. If there are k pixels, the observation matrix for n bands is:

$$A = \begin{bmatrix} b_1^1 & \cdots & b_n^1 & 1 \\ \vdots & \ddots & \vdots & 1 \\ b_1^k & \cdots & b_n^k & 1 \end{bmatrix} \quad \text{(eq. 2)}$$

where the column of 1's is for the constant offset c. And the pseudo-pan values matrix for Image A is:

$$B = \begin{bmatrix} p^1 \\ \vdots \\ p^k \end{bmatrix} \quad \text{(eq. 3)}$$

The least-squares solution for the gains and offset is then obtained by:

$$(A^TA)^{-1}(A^TB) \quad (\text{eq. 4})$$

The resulting array is the gain values and the offset value. The gains and offset are applied to the pixel values of band set B to yield Image B as described in (eq. 1). Alternately, a single gain and offset may be calculated but will provide less accurate balancing.

The computer-implement system is suitably configured to apply masks to the pseudpan images (step 50) to exclude areas of the pseudo-pan images from further processing for reasons of computational efficiency. For example, the system may apply cloud, water or vegetation masks.

In order to use time lag to detect moving vehicles the sets of band images in the multi-band image must otherwise be closely registered, typically within less than one pixel. The current sources of multi-band images including WV-2 and WV-3 satisfy this criteria. For reasons unknown, certain multi-band images (e.g. WV-2 and WV-3) that satisfy this overall criteria exhibit a sub-pixel misregistration 52 as shown in FIG. 3C that is correlated to the column number of the image, which was discovered via the localized correlation used to detect moving vehicles. If present in the source multi-band image, the computer-implemented system is suitably configured to perform a local band-to-band registration (step 54) to remove the column-dependent misregistration.

Figure 3A:
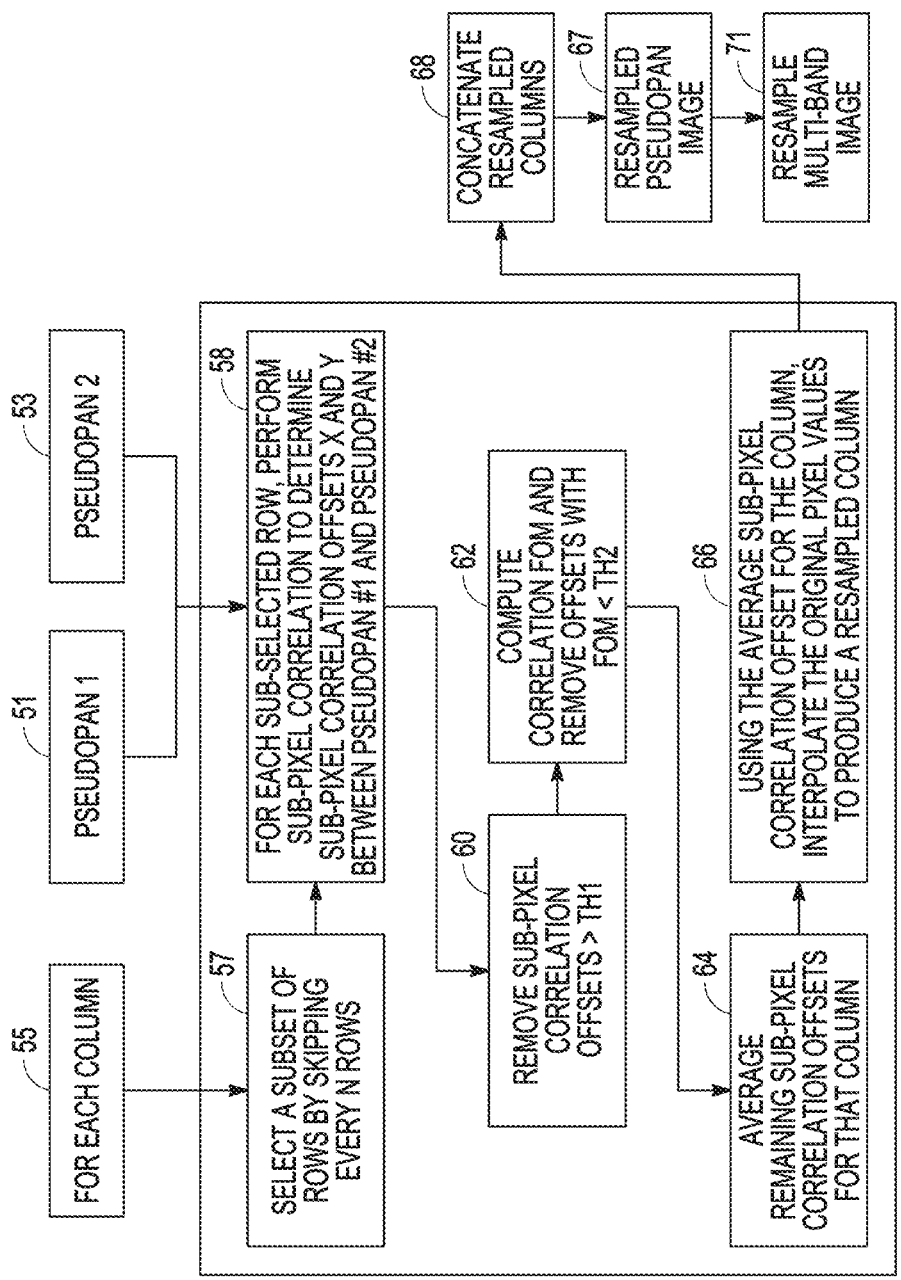
FIGS. 3A-3C illustrate a computer-implemented method to reduce sub-pixel misregistration that is correlated to the column number in the multi-band image.
Figure 3B:
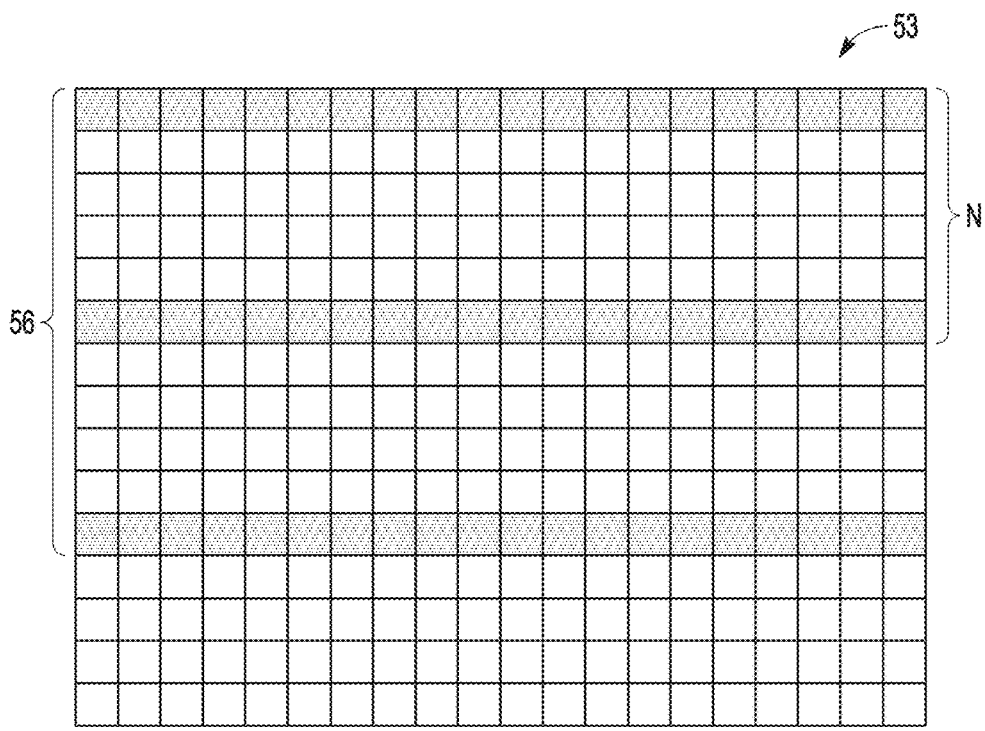
Figure 3C:
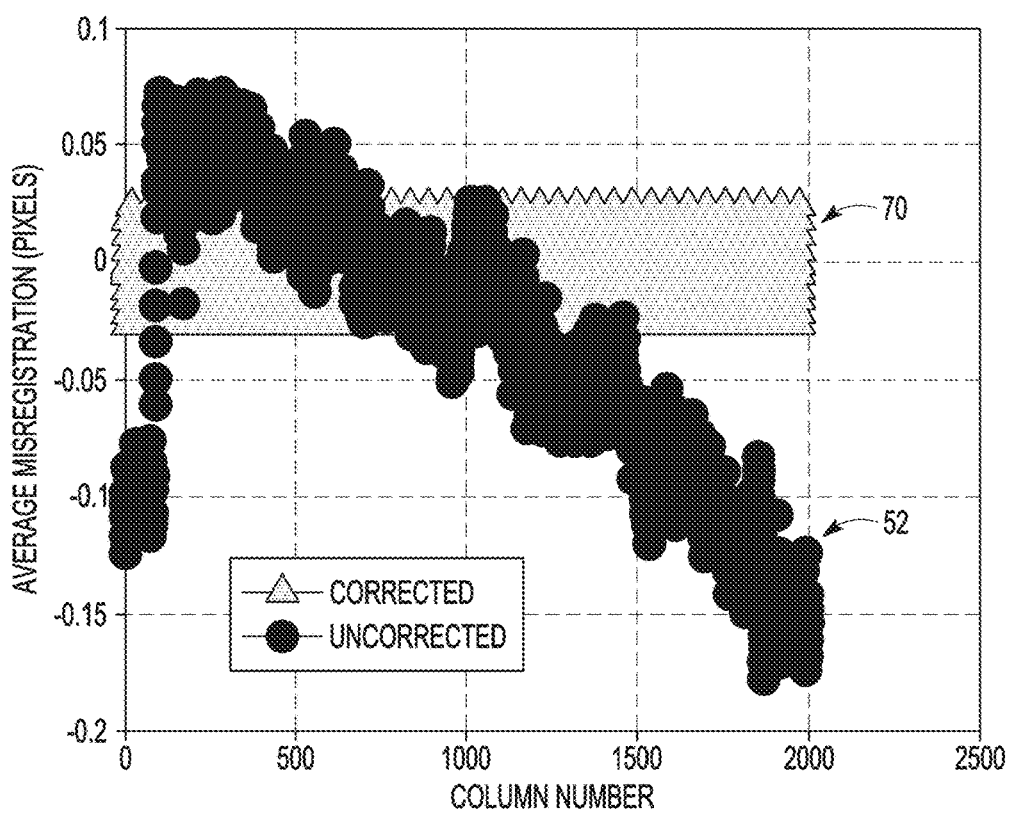

As shown in FIGS. 3A-3C, the computer-implemented system is configured to, for each column (step 55) in the pseudo-pan images 51 and 53, downsample the pseudpan image by N to select a subset 56 of rows (step 57) and for each row in the subset perform a localized subpixel correlation (e.g. N×N pixel block) to produce X and Y correlation offsets between the pseudo-pan images (step 58). The subset of rows could include every row but that is not necessary to achieve accurate offset values and increases computational complexity. A sensitivity analysis will indicate how many rows can be skipped without degrading the results. Even considering the sub-pixel misregistration 52, the pseudo-pan images are registered to within a specified value, typically a pixel. Therefore, the computer-implemented system can be configured to remove any correlation offsets that exceed a specified threshold (TH1), again typically 1 pixel, as those offsets are indicative of either a correlation error or a moving vehicle (step 60). The computer-implemented system is suitably configured to compute a Figure of Merit (FOM) for any of the remaining correlations offsets as a measure of the confidence in the peak in the correlation surface at the correlation offset and to remove any correlation offsets with FOM less than a specified threshold (TH2) (step 62). The remaining X and Y correlation offsets are averaged over the column (step 64) and used to interpolate pixel values from the pseudo-pan images to produce resampled pixels values for all rows in the column (step 66). The resampled pixels values are concatenated for all columns to form resampled pseudo-pan images 67 with reduced band-to-band misregistration (step 68). As shown in FIG. 3C, a corrected average misregistration 70 is <<1 pixel and no longer dependent on column number. The individual band images of the multi-band image can be similarly resampled (step 71) to remove this registration and used in subsequent processing to extract and match the spectral roadway signatures. However, the accuracy of the registration to detect and locate moving vehicles is more stringent than the accuracy required to extract signatures and grow the network.

Figure 2:
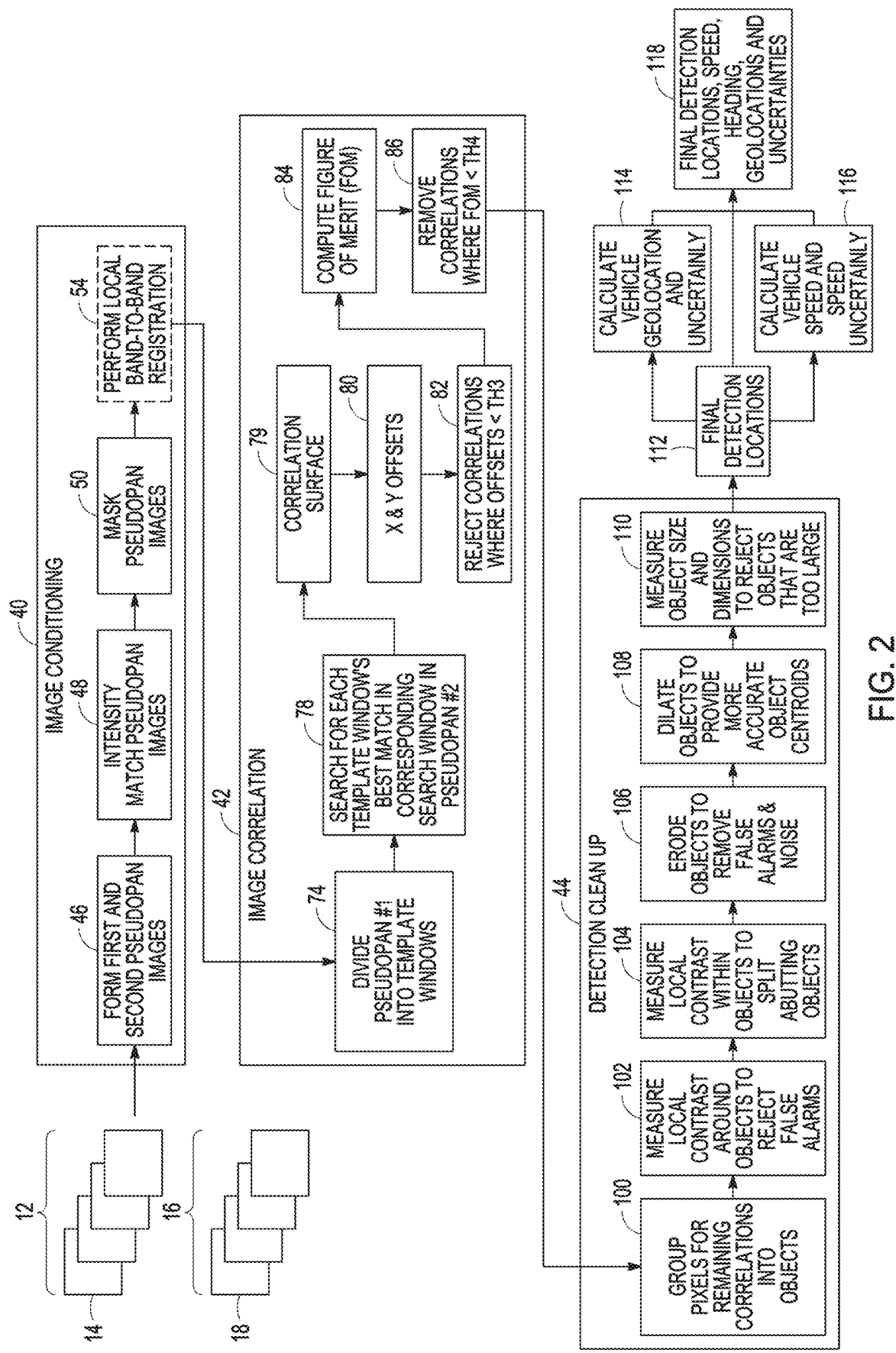
FIG. 2 illustrates a fully-automated computer-implemented method to exploit the time lag between collection of first and second sets of images in the multi-band image to detect moving vehicles.
Figure 4:
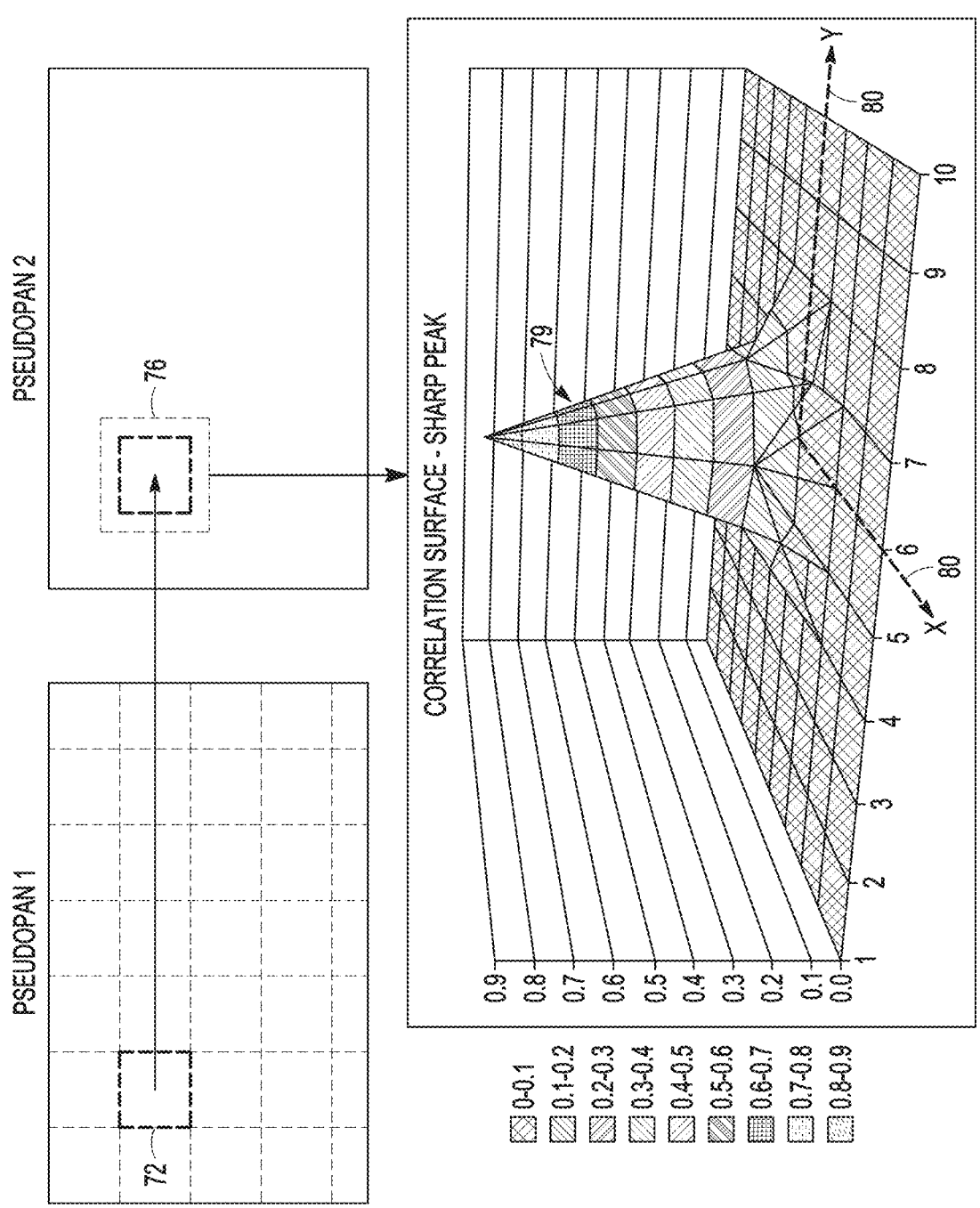
FIG. 4 illustrates a computer-implemented method for the local correlation of template windows from a first set of band images to larger search windows in a second set of band images collected with a time lag to detect and locate possible moving vehicles.

Referring back to FIG. 2, the computer-implemented system is configured to implement the localized sub-pixel image correlation (step 42) to search the entire multi-band image (sans the masked areas) to identify individual pixels (or small groups of pixels) that likely correspond to moving vehicles. As shown in FIGS. 2 and 4, the computer-implemented system divides the first pseudo-pan image into many small "template" windows 72 of N×N pixels, where N is a small number such as 7, 9, or 11 (depending on image Ground Sample Distance (GSD) i.e. the ground space in square meters covered by an image pixel), so that the window is only large enough to contain one or two vehicles and a small amount of surrounding roadway (step 74). The system searches for each template window's best match within a corresponding search window 76 in the second pseudo-pan image (step 78). The search window 76 is centered on the same pixel location as template window 72 but is several pixels larger than the template window to allow for vehicle movement. The size of the search window is based on the GSD of the image and the expected maximum speed of moving vehicles. The correlations for the multiple template windows are suitably run in parallel in a scalable multi-threaded implementation.

The computer-implemented system is suitably configured to implement a Least Squares Correlation (LSC) or Normalized Cross Correlation (NCC), traditional techniques that allow for sub-pixel measurement of the X and Y offsets (step 80) from a correlation surface 79 for each template window. Both techniques compute the difference in pixel values between the template window and search window at each template window position to determine a cost function that expresses the similarity (or difference) between pixel values. The LSC uses a squared difference and the NCC uses an absolute value difference to compute the cost function. The pixel cost is added to a running sum for the current template position to assign a total cost to the correlation surface for the current template position. Low costs being representative of a positive correlation to a detected moving vehicle.

Figure 5:
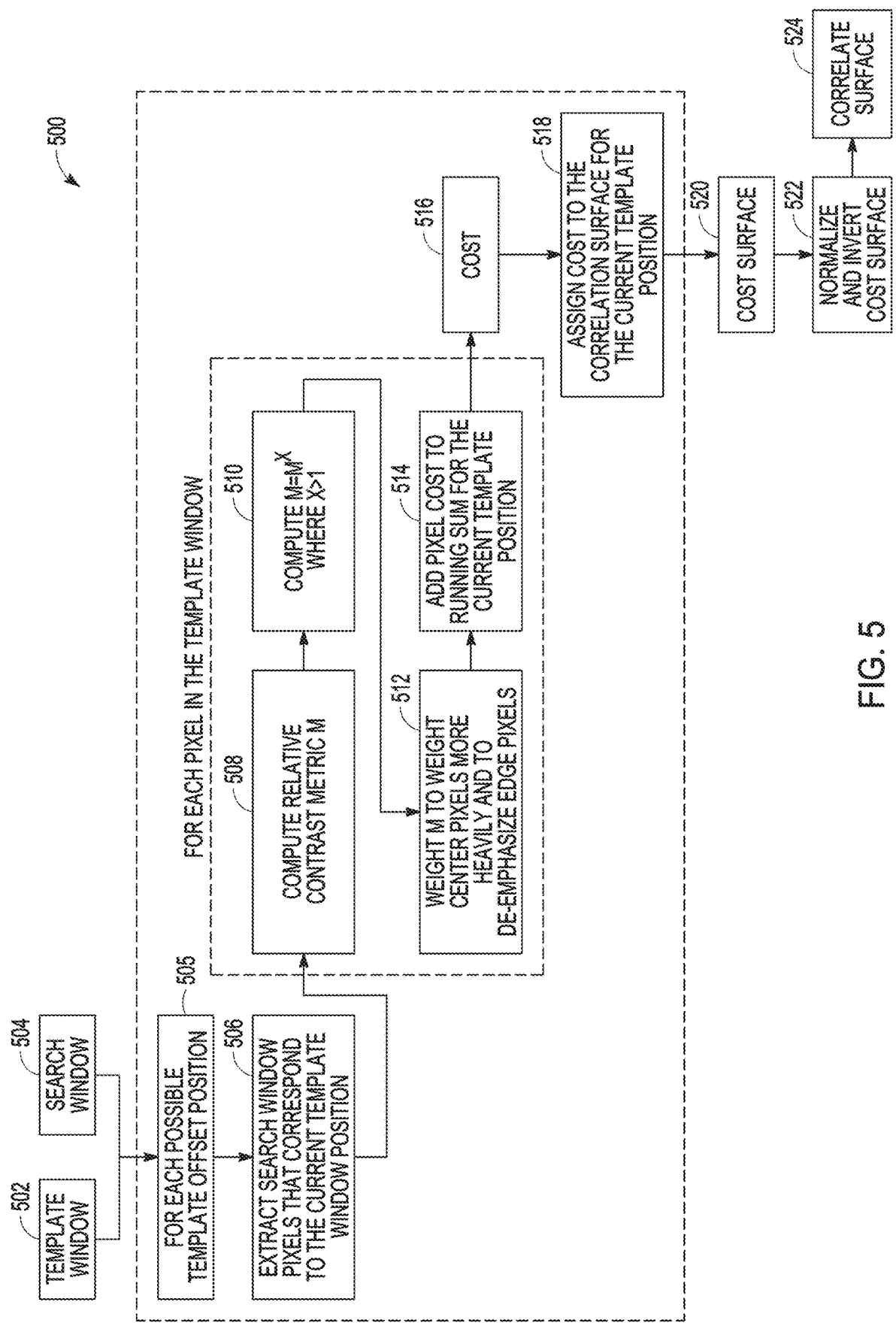
FIG. 5 illustrates a computer-implemented method for performing the local correlation.

Referring to FIG. 5, a correlation 500 tailored to moving vehicle detection modifies the cost function to more heavily weight central pixels (i.e., vehicle pixels at the center of the windows) and to de-emphasize content that might cause FAs such as mixed pixels along road edges. The correlation is more sensitive to small objects and less sensitive to noise. The result is more true moving vehicle detections with sub-pixel measurement and fewer false alarms.

Correlation 500 slides a template window 502 across a somewhat larger search window 504 to extract search window pixels that correspond to the current template window position (step 506) for each possible template offset position (step 505) within the search window. For each pixel in the template window, the correlation computes a relative contrast metric M between the corresponding pixels in the first and second pseudo-pan images (step 508). For example, M=(pT−pS)/(pT+pS)*100 where pT and pS are the pixel values in the template and search windows in the first and second pseudo-pan images. The metric M is raised to an exponent X e.g. M=$M^X$ where X>1 to penalize large differences more heavily (step 510). A weight factor W is applied to the metric M (M=W(M)) to weight center pixels more heavily and to de-emphasize edge pixels to emphasize vehicles (step 512). For example, W=1 for center pixels and W=0.25 for edge pixels. The pixel costs M are added in a running sum for the current template (step 514) to generate a total cost (step 516) that is assigned to the correlation surface for the current template position (step 518). The total costs for each possible template offset position generate a cost surface (step 520). This surface is normalized and inverted (step 522) so that high costs have a low score and low costs have a high correlation score. A low cost score representing the alignment of a vehicle in the template and search windows will have a high correlation score e.g. a sharp peak in the correlation surface.

The ability to provide sub-pixel measurements is important because in practice, some slower-moving vehicles have been observed to have total motion magnitudes of 0.7-0.8 pixels (~0.5 pixels in the individual line and sample directions). Also, the decimal component of the offset is important for making an accurate speed calculation; when the motion offset is just one or two pixels, an offset of 1.2 pixels versus an offset of 1.6 pixels (for example) is a 33% difference in speed.

The correlator measures the template window's best matching location within the search window, and provides the X (line) and Y (sample) pixel offsets of this matching location. For example, the correlator might calculate the best match for a moving vehicle's template window to have an offset of +1.2 line pixels and −0.7 sample pixels in the search window, for a total displacement Δp of 1.4 pixels.

$$\Delta p = \sqrt{\Delta l^2 + \Delta s^2} \qquad \text{(eq. 5)}$$

The line and sample offsets are used to calculation the speed and direction of motion. The velocity can be calculated as the correlator offset in pixels Δp times the GSD of the image divided by the time between band sets Δt.

$$v = \frac{\Delta p * GSD}{\Delta t} \qquad \text{(eq. 6)}$$

The direction of motion can be calculated as the arctangent of the correlator line and sample offsets Δl and Δs.

$$\theta = a\tan 2(\Delta l, \Delta s) \qquad \text{(eq. 7)}$$

With reference to FIG. 2, image conditioning (step 40) applied image balancing to minimize the intensity differences in the two 4-band sets, but each band has its own sensor response so the intensities will never exactly match. This causes the correlator to have non-zero results even in static areas. Therefore, a detection threshold (TH3) is needed to reject noise (step 82). In practice, a threshold of about 0.75 pixels works well in most cases. Pixels with a motion magnitude above this threshold are treated as potential detections. The detection threshold should be bounded away from zero to reject noise and be less than 1 to capture sub-pixel movement.

Although remaining X and Y offsets indicate candidate detected moving vehicles with sufficient detected motion to warrant further processing, the computer-implemented system is suitably configured to further asses confidence in those correlations and the X and Y offsets; do they represent actual moving vehicles or a correlation error? The system is configured to compute a Figure of Merit (FOM) (step 84) for each offset pair (correlation) and reject correlations whose FOM is less than a threshold (TH4) (step 86). The FOM threshold is typically derived numerically from test data.

A traditional approach would be to assess the quality of the peak at the X and Y offsets in the correlation surface (cost surface) generated by the LSC, NCC or the moving vehicle correlator. The peak correlation score is an indicator of how good the match is overall. Also, the noise component of the result can be assessed by comparing the peak correlation score to the next-highest score that is at least a certain distance away from the peak. A certain distance range must be enforced to prevent using a secondary value that is in actuality part of the main peak. This distance limit can either be a defined value, or a fraction of the search area size, e.g., one-eighth of the search area size. Accordingly the FOM may be computed using known techniques such as a ratio of primary to secondary peak height or using an approach tailored to moving vehicle detection, which compensates for sub-pixel offsets when computing peak heights. An example of the later computes the FOM as 1−A/B where B is a maximum value in the resampled correlation surface and A is a next highest value at least a radius R away from the location of the maximum value in the resampled correlation surface.

Figure 6:
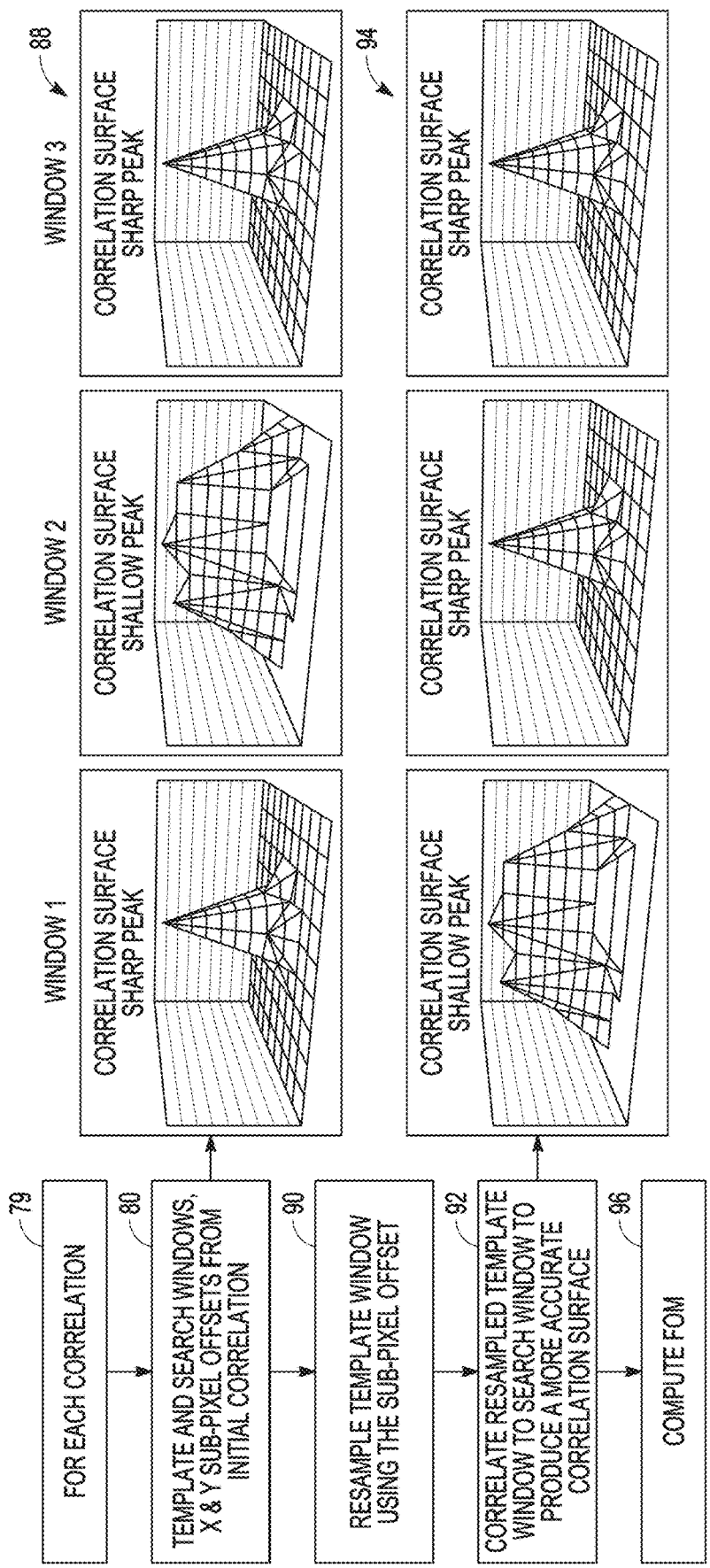
FIG. 6 illustrates a computer-implemented for computing a Figure of Merit (FOM) for the possible moving vehicle detections to improve the False Alarm (FA) rate.

As shown in FIG. 6, another approach is, for each X and Y offset pair (step 79) provided in step 80 and correlation surface 88, to configure the computer-implemented system to resample the template window from the first pseudpan image (or the search window from the second pseudo-pan image) using the X and Y sub-pixel offsets (step 90) and to correlate the resampled template window to the corresponding search window (or template window to the corresponding resampled search window) (step 92) to produce a more accurate correlation surface 94. The system computes a FOM based on the new correlation surface 94. The FOM based on the new correlation surface 94 is more accurate because it reduces the influence that mixed pixels and pixel phasing can have on the correlation surface. Object edges will practically never align exactly with the edges of pixels; rather, there will be a strip of pixels that contains mixed content (for example, a ring of pixels around a vehicle that contain both vehicle and road content). In the original correlation, the distribution of the mixed pixel content relative to the vehicle edges may be different in the two band sets (for example, the mixed pixels at the front of the car may be majority road in the template window but majority vehicle in the search window), which can cause the original FOM correlation peak to appear either sharper or flatter than the underlying real objects should indicate. But by performing the sub-pixel resampling, the mixed pixel content is brought closer into alignment between the two correlation windows, enabling a more reliable correlation surface and subsequent FOM calculation.

Referring back to FIG. 2, the computer-implemented system is configured to process the remaining correlations (i.e., candidate moving vehicle pixels) to clean up and output the detected moving vehicles (step 44). The system is configured to group all of the contiguous pixels for remaining correlations whose X and Y offsets exceed the noise threshold and exhibit a FOM with sufficiently high confidence into objects (step 100).

The system is configured to measure a local contrast around each object to reject false alarms (step 102) and within objects to split abutting objects (step 104). For example, a ring contrast may be computed as a ratio of average center pixel values (presumably moving vehicle pixels) to average pixel values in a ring around the center (presumably not moving vehicle pixels). The specific contrast may be computed as 1−(min(centerAvg,ringAvg)/max (centerAvg,ringAvg))). This may be augmented with a directional contrast calculation. Instead of the entire ring, a directional contrast is calculated between the center pixel and directional offset groups of pixels (upper-left, upper, upper-right, right, lower-right, lower, lower-left, and left). To reject FAs, if the contrast is greater than a threshold, the object is retained. If not, if at least a certain number (e.g., 5)

of the directional contrasts exceed a threshold, the object is retained. To split objects, the contrast calculations are done for each pixel in the image (each pixel is the center of a ring). After the detections are grouped into objects, the system looks for lines of minimal contrast within the object to split the object.

The system is suitably configured to erode the object to remove false alarms and noise pixels from the object (step 106). Standard erosion techniques for image processing to remove outer pixels from a shape may be employed. The system is suitably configured to dilate objects to provide more accurate object centroids (step 108). Standard dilation techniques for image processing to add outer pixels to complete a specified shape may be employed. Erosion removes the outer pixels from each object. This completely removes objects that are too small/narrow to be vehicles (e.g., bits of noise, road edges, etc.) but leaves the interior of vehicles, which can then be expanded out again by dilating. Dilating also closes in gaps in the vehicle (in practice, we sometimes only detect a moon-shaped or other concave subset of pixels from the car instead of the full outline, so dilation expands this). Once erosion and dilation is complete, the system is suitably configured to measure object size and dimensions to reject objects that are too large (to be a moving vehicle) (step 110).

The computer-implemented system is suitably configured to use overlapping template windows so that there are multiple detections per vehicle. This allows the system to further reject noise and false alarms from isolated single detects or shapes that do not match a vehicle size. For example, the edge of a building or roadway may produce a long, thin line of detections that may have the same correlator offset as a slow-moving vehicle. The size and shape of each object can be analyzed for consistency with a vehicle profile. This can also allow us to estimate the size of vehicles, possibly differentiating between cars, trucks, and larger vehicles.

The system is configured to at minimum output a list of detected moving vehicles and their image coordinate locations (step 112). The system is suitably configured to estimate geolocation and associated geolocation uncertainty (step 114). Geolocation position uncertainty is estimated by propagating sensor uncertainty metadata and elevation uncertainty metadata through a suitable sensor model when calculating vehicles' geolocation. The system is suitably configured to use the time lag between collection of the first and second sets of band images and the pixel GSD to calculate vehicle speed and associated uncertainty from the correlation offsets (step 116). Speed uncertainty is calculated by propagating uncertainties in the sensor time lag, image GSD, and/or correlation offset through (eq. 6). The system may also output vehicle speed and headings, which may be used in subsequent processing to extract the road network map (step 118). They system may also output vehicle geolocation and uncertainties for each of the geolocation, speed and headings, which may be useful for other applications (step 118).

Extraction of Image-Specific Spectral Roadway Signatures

Referring now to FIGS. 7A-7E, the computer-implemented system and method is configured to extract pixel values from the multi-band image at pixels adjacent to the locations of detected moving vehicles to characterize at least one image-specific spectral roadway signature. The computer implemented system and method receives a list of detected moving vehicles 200 with their locations and possibly speed and headings. For each detection, the system extracts pixels 202 adjacent to the locations of the detected moving vehicles (step 204). For example, pixels 202 in a ring about the detection location may be extracted. The system processes the extracted pixels 202 to remove any outliers 206 (step 208). For example, the system may be configured to compute an average pixel value and standard deviation for all adjacent pixels and to remove any pixels whose pixel value is greater than N standard deviations from the average.

Figure 7A:
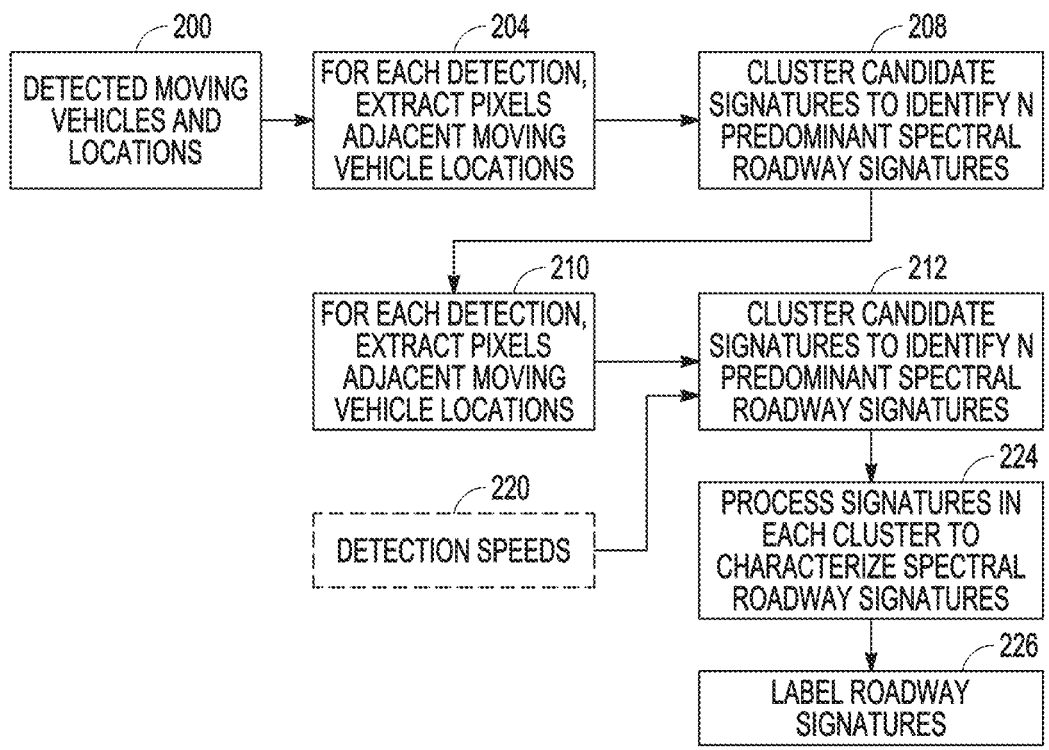
FIGS. 7A-7E illustrate the computer-implemented extraction of pixel values from each of the bands from the multi-band image at pixel adjacent the locations of the detected moving vehicles to characterize one or more image-specific spectral roadway signatures.
Figure 7B:
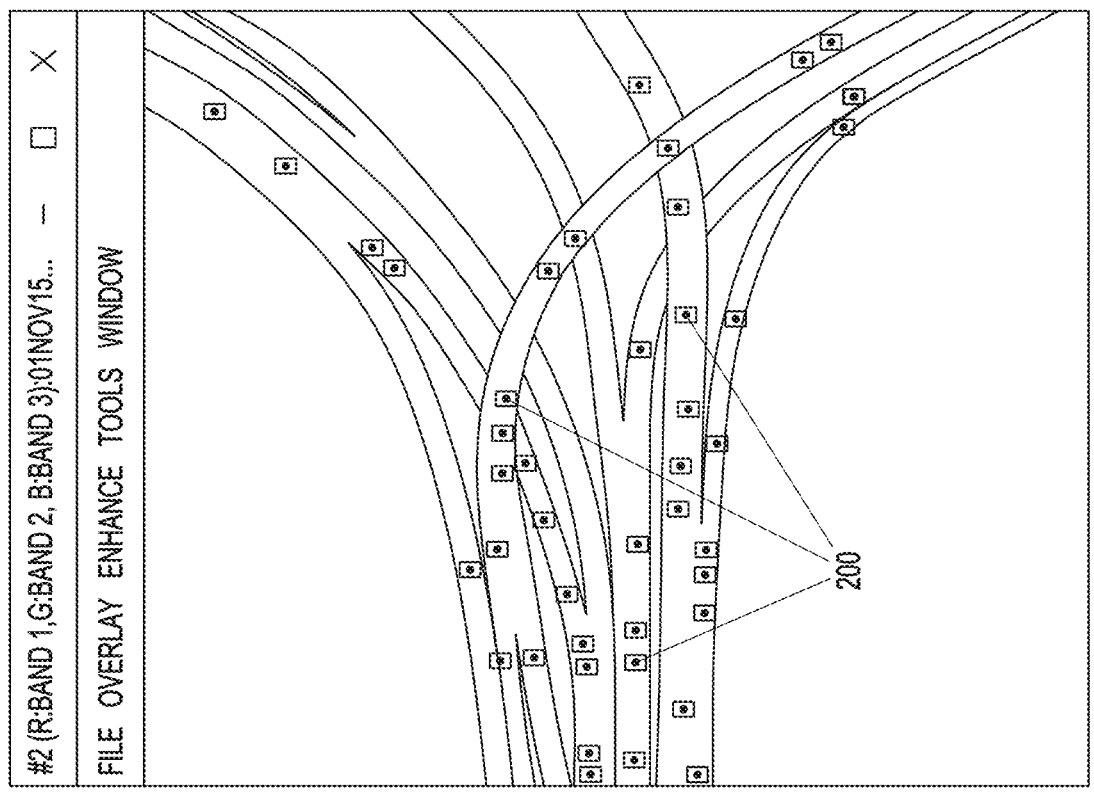
Figure 7C:
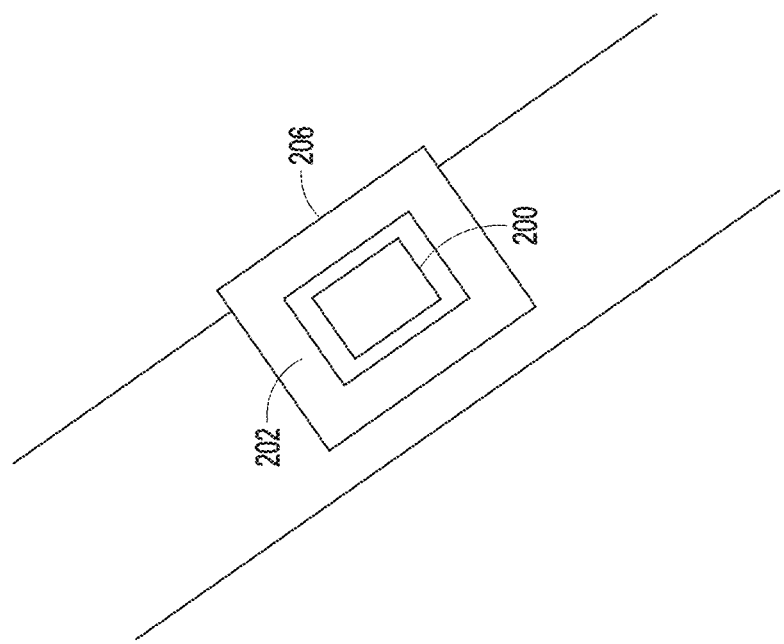
Figure 7D:
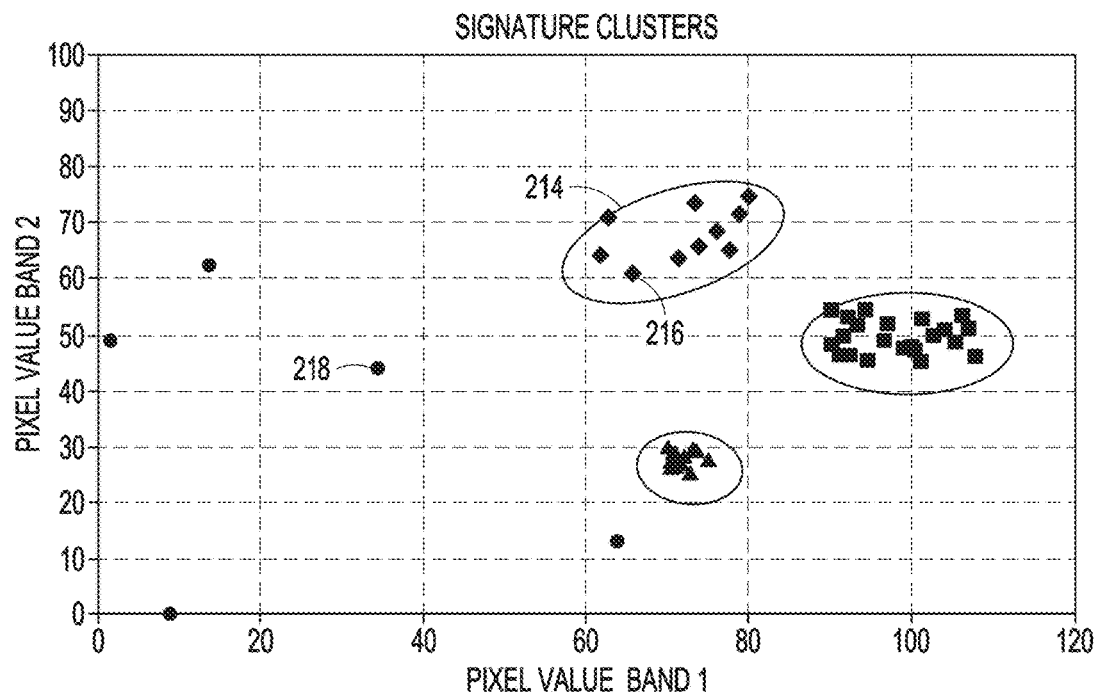
Figure 7E:
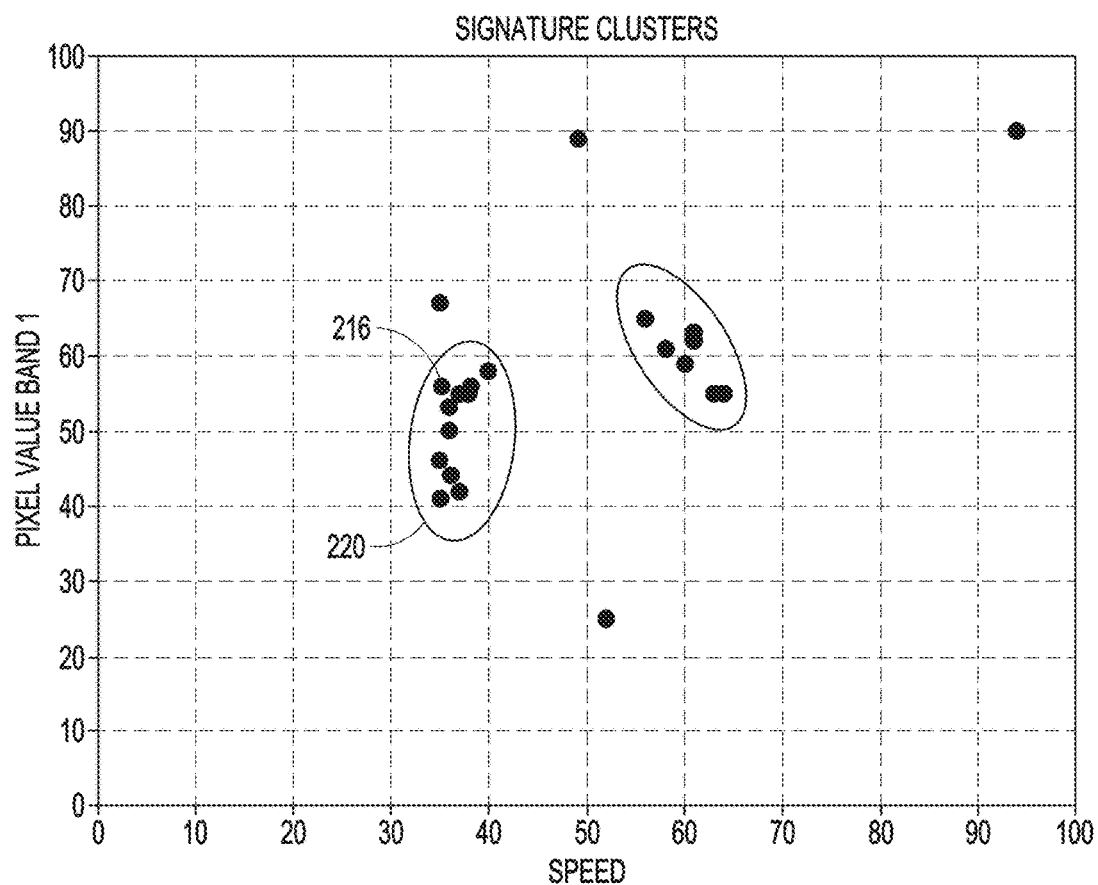

The system is configured to compute a candidate spectral roadway signature for the remaining pixels for each detection (step 210). The system may compute the signature as an average pixel value and standard deviation in each of the bands of the multi-band image (e.g. each of the 8 bands in the WV-2 image). To improve processing efficiency and classification accuracy, the system is suitably configured to cluster the candidate signatures to identify a reduced number N of predominant spectral roadway signatures (step 212). The number N can be preset or can be determined by the clustering algorithm. For simplicity, clusters 214 of candidate signatures 216 based on average pixel values in Bands 1 and 2 is depicted in FIG. 7D. The actual clustering algorithm will cluster in all 8 bands simultaneously. As shown, the clustering algorithm can also serve to remove spurious candidate signatures 218. Other operating parameters such as vehicle speed 220 may be included as dimensions in the clustering algorithm to further refine extraction of the signatures. As shown in FIG. 7E, candidate signatures 216 are grouped into clusters 222 based on average pixel values in Band 1 and vehicle speed. These two distinct signatures would likely have been clustered into a single less well defined signature without the additional speed parameter. In general, the actual clustering algorithm will cluster in all 8 bands plus any operating parameters simultaneously. The system processes the candidate signatures in each cluster to characterize an image-specific spectral roadway signature (e.g., an average pixel value for each band) with associated per-band standard deviations (step 224). The system is suitably configured to label each of the spectral roadway signatures with a type roadway corresponding to the signature (e.g., concrete, asphalt, gravel, dirt, etc.) (step 226). The system may be configured to compare each spectral roadway signature to a library of signatures for the road types and select the closest match. For the limited purpose of labeling a signature, a library of signatures for roadway types is sufficiently accurate. For the more general purpose of growing the road network map, it is critical that the moving vehicles are first detected and located and then the signatures derived from the same multi-band image for which the road network map is created.

Growing the Road Network Map

Figure 8A:
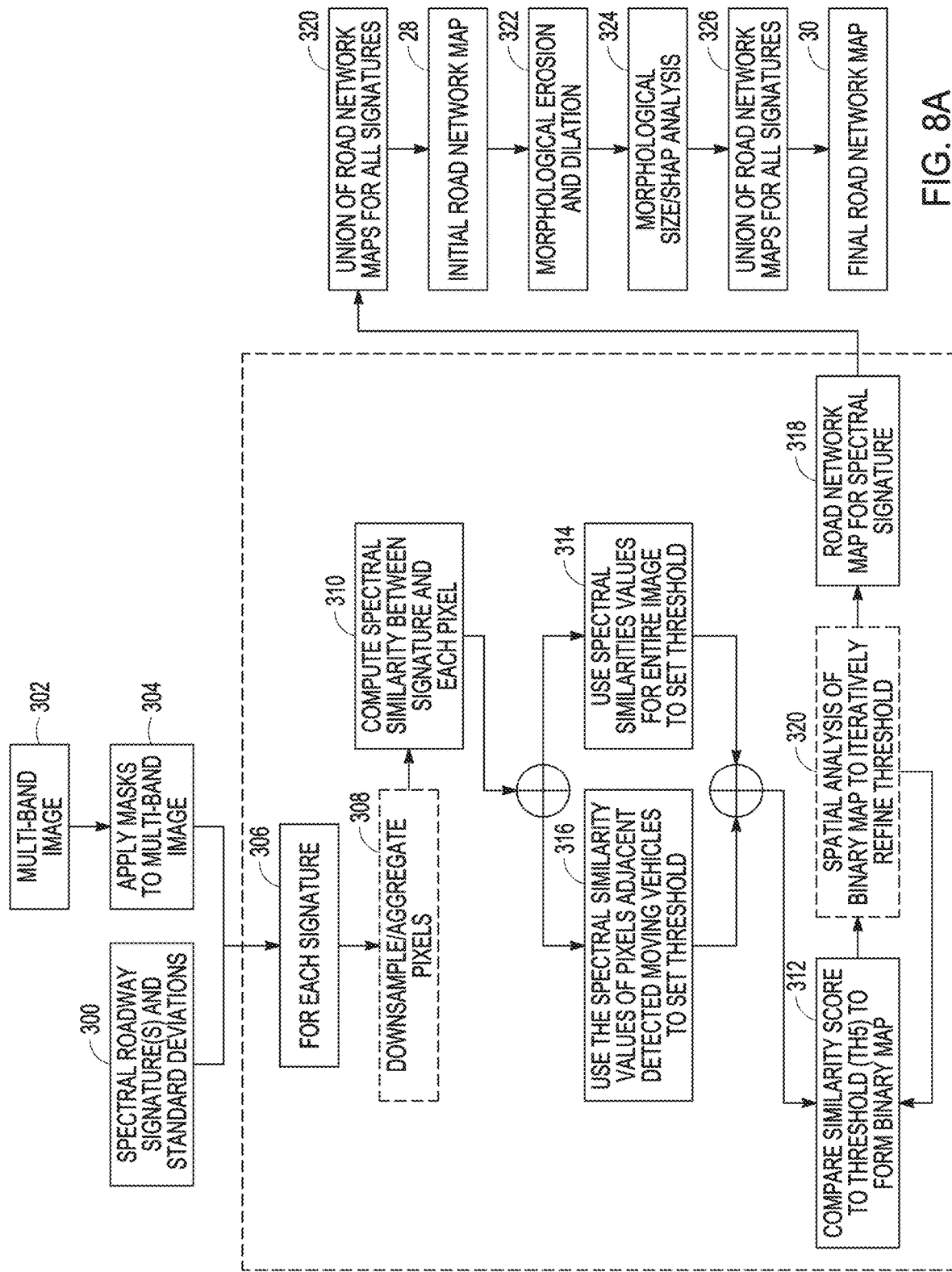
FIGS. 8A-8B illustrate a computer-implemented method for searching the multi-band image to match the one or more image-specific spectral roadway signatures to grow the road network map.
Figure 8B:
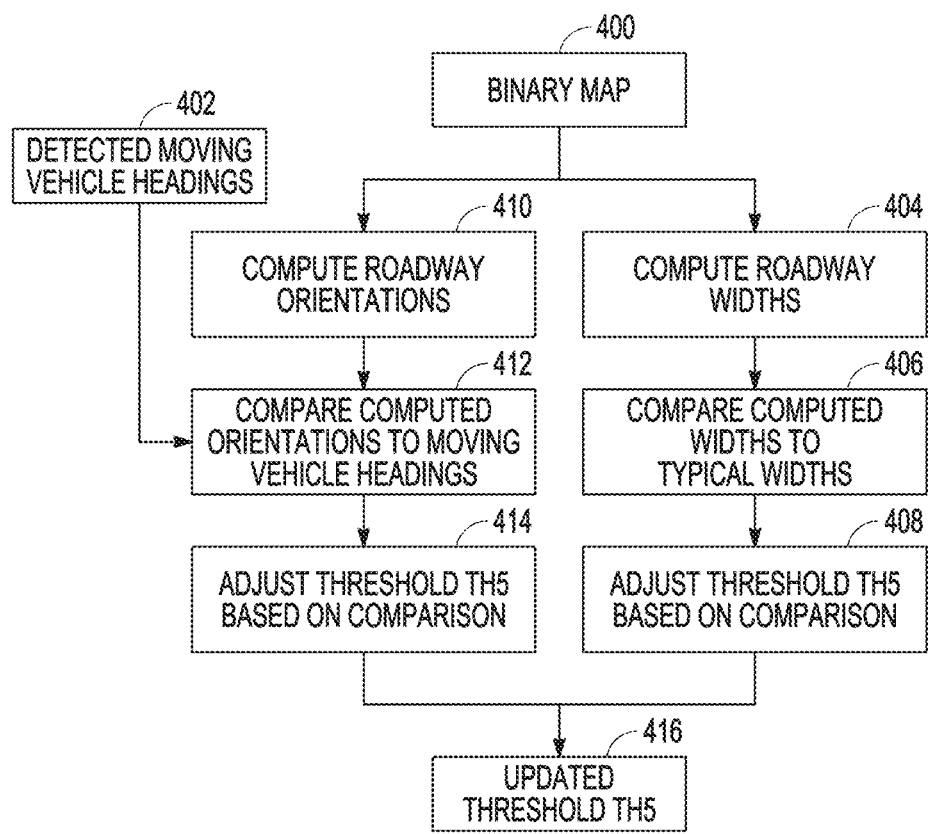

Referring now to FIGS. 8A-8B, the computer-implemented system and method is configured to search the multi-band image to match each of the image-specific spectral roadway signatures to pixel values in the scene (radiance) or representative of the scene (reflectance) to grow a road network map. The system is configured to receive the spectral roadway signatures and deviations (and possible the locations of the detected moving vehicles) (step 300) and the multi-band image (step 302) and apply any masks (vegetation, water, clouds) to the image (step 304).

For each image-specific spectral roadway signature (step 306), the system may be configured to downsample or aggregate pixels in the remaining portions of the multi-band image (step 308) to reduce the computational load. The system computes a spectral similarity between the signature and each remaining pixel in the multi-band image (step 310). Standard spectral similarities include the Mahalanobis distance, Spectral Angle Mapper, Spectral Correlation mapper and Euclidean distance that measure the similarity between two vectors (e.g. the 8-band signature) and output a single score. Alternately, a similarity metric could be configured to produce a score for each band. The spectral similarity may account for both the differences in pixel values and standard deviations. The system then compares the score(s) to a threshold (TH5) to form a binary map of road pixels (step 312). First, the system is configured to generate the threshold (TH5). In one case, the system is configured to use spectral similarity values across the entire multi-band image (or a database of similar multi-band images) to set threshold (TH5) (step 314). In another case, the system is configured to use only the spectral similarity values for pixels adjacent detected moving vehicles to set threshold (TH5) (step 316). The threshold is set so that adjacent pixels that are vehicle pixels satisfy the threshold and adjacent pixels that were excluded as outliers do not satisfy the threshold.

The system may be configured to output the binary map as the road network map for each spectral signature (step 318) or to perform a spatial analysis of the binary map to iteratively refine and reapply threshold TH5 (step 320). As shown in FIG. 8B, the system is configured to receive the binary map (step 400) and the headings for the detected moving vehicles (step 402). In one thread, the system computes the width of roadways in the binary map (step 404), compares those widths to typical roadway widths (406) and adjusts the threshold TH5 based on that comparison (408). For example, if the computed widths are too narrow, threshold TH5 may be lowered in order to capture more road pixels. In another thread, the system computes the orientations of roadways (step 410), compares those orientations to the headings of the detected moving vehicles (step 412), and adjusts the threshold TH5 based on that comparison (step 414). The system updates threshold TH5 (step 416) and returns to step 312 to reapply the threshold to the similarity metrics to update the binary map.

The system is configured to form a union of the road network maps for all of the image-specific spectral roadway signatures (step 320) to produce the initial road network map 28. As with the moving vehicles, the road network map is processed to clean-up the map to form the final road network map 30. The system may be configured to implement morphological erosion by M and dilation by N where N>=M to remove noise and fill in gaps in the roads (step 322) and morphological size/shape analysis to remove structures such as parking lots or buildings that may have similar signatures to concrete roads (step 324). The system may be configured to label different portions of the road network map to signify the type of road (concrete, asphalt, gravel, dirt etc.), the direction of traffic flow and the approximate speed of traffic flow (using the headings and speeds of the detecting moving vehicles) (step 326).

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A computer-implemented method of automated road nets pork identification, said computer programmed to implement the steps of:
receiving a single multi-band image including a first set of band images and a second set of band images collected with a time lag relative to the first set;
exploiting the time lag between the first and second sets to detect moving vehicles in the single multi-band image;
using the detected moving vehicles to extract pixel values from the single multi-band image at pixels adjacent to the locations of the detected moving vehicles to characterize at least one image-specific spectral roadway signature by
computing a candidate spectral roadway signature from the pixels adjacent each detected moving vehicle;
measuring a speed of each detected moving vehicle;
including the speed as an additional dimension in the candidate spectral roadway signature for each detected moving vehicle; and
clustering the candidate spectral roadway signatures to identify said at least one image-specific spectral roadway signature, wherein the at least one image-specific spectral roadway signal does not include speed as a dimension;
searching the single multi-band image to match the at least one image-specific spectral roadway signature to pixel values for each of the bands for groupings including at least one pixel to grow a road network map.

2. The computer-implemented method of claim 1, further comprising:
forming first and second pseudo-pan images as a weighted average of one or more band images in the first set and a weighted average of one or more band images in the second set, respectively, wherein the time lag between the first and second pseudo pan images is exploited to detect the moving vehicles.

3. The computer-implemented method of claim 1, further comprising:
comparing the image-specific spectral roadway signatures to a library of signatures for different classes of roadways to label each image-specific spectral roadway signature.

4. The computer-implemented method of claim 1, wherein each said image-specific spectral roadway signature includes pixel values representing radiance measurements of a scene in all of the bands in both the first and second sets of the multi-band image.

5. The computer-implemented method of claim 1, wherein the step of searching the multi-band image to grow the road network map comprises
for each image-specific spectral roadway signature,
selecting a subset of pixels from the multi-band image;
computing a spectral similarity metric to each pixel in the subset;
applying a threshold to the similarity metric for each pixel to create a binary roadway map;
combining the binary roadway map for all of the image-specific spectral roadway signatures to generate the road network map.

6. The computer-implemented method of claim 5, further comprising:
using only the spectral similarity metrics at pixels adjacent to the locations of detected moving vehicles to compute an image-specific threshold.

7. The computer-implemented method of claim 1, wherein clustering the candidate spectral roadway signatures produces a plurality of image-specific spectral roadway signatures to differentiate different types of roadway surfaces based at least in part on the additional dimension for speed of the detected moving vehicle.

8. A computer-implemented method of automated road network identification, said computer programmed to implement the steps of:
  receiving a single multi-band image including a first set of band images and a second set of band images collected with a time lag relative to the first set;
  forming first and second pseudo-pan images as a weighted average of one or more band images in the first set and a weighted average of one or more band images in the second set, respectively;
  pre-processing the first and second pseudo-pan images to improve registration by
  for each column in the first and second pseudo-pan images,
    selecting a subset of rows;
    for each row in the subset, performing a localized sub-pixel correlation to produce X and Y sub-pixel correlation offsets between the first and second pseudo-pan images;
    averaging the sub-pixel correlation offsets X and Y to produce Xavg and Yavg average sub-pixel correlation offsets;
    using the average sub-pixel correlation offsets Xavg and Yavg to interpolate pixel values from the first or second pseudo-pan images to produce resampled pixel values for all rows in the column; and
  concatenating the resampled pixel values for all columns to form resampled first or second pseudo-pan images,
  exploiting the time lag between the first and second resampled pseudo pan images to detect moving vehicles in the single multi-band image;
  using the detected moving vehicles to extract pixel values from the single multi-band image at pixels adjacent to locations of detected moving vehicles to characterize at least one image-specific spectral roadway signature; and
  searching the single multi-band image to match the at least one image-specific spectral roadway signature to pixel values for each of the bands for groupings including at least one pixel to grow a road network map.

9. The computer-implemented method of claim 8, further comprising:
  removing the X and Y correlation offsets that exceed a first threshold;
  computing a Figure of Merit (FOM) for each of the remaining X and Y correlation offsets and removing the X and Y sub-pixel correlation offsets whose FOM is less than a second threshold; and then
  averaging the remaining X and Y sub-pixel correlation offsets to produce the Xavg and Yavg average correlation offsets.

10. The computer-implemented method of claim 8, further comprising:
  using the average sub-pixel correlation offsets Xavg and Yavg to interpolate pixel values from the one or more band images in the first and second sets to produce resampled values for a resampled multi-band image that is used to extract the at least one image-specific spectral roadway signature and grow the road network map.

11. A computer-implemented method of automated road network identification, said computer programmed to implement the steps of:
  receiving a single multi-band image including a first set of band images and a second set of band images collected with a time lag relative to the first set;
  forming first and second pseudo-pan images as a weighted average of one or more band images in the first set and a weighted average of one or more band images in the second set, respectively;
  exploiting the time lag between the first and second pseudo pan images to detect moving vehicles in the single multi-band image by
    segmenting the first pseudo-pan image into a plurality of local template windows;
    correlating each local template window to a larger search window in the second pseudo-pan image to produce a correlation surface;
    extracting X and Y correlation offsets from the correlation surface for each template window;
    rejecting correlations where X and Y correlation offsets are less than a first threshold;
    computing a Figure of Merit (FOM) for each of the correlations; and
    removing correlations whose FOM is less than a second threshold whereby any remaining correlations identity the moving vehicles;
  using the detected moving vehicles to extract pixel values from the single multi-band image at pixels adjacent to locations of detected moving vehicles to characterize at least one image-specific spectral roadway signature; and
  searching the single multi-band image to match the at least one image-specific spectral roadway signature to pixel values for each of the bands for groupings including at least one pixel to grow a road network map.

12. The computer-implemented method of claim 11, wherein the step of correlating each local template window to the larger search window further comprises:
  for each possible template offset position relative to the larger search window, extracting pixels from the search window that correspond to the template offset position;
  for each pixel in the template window,
    computing a relative contrast metric M from pixel values in the template and search windows for the first and second pseudo-pan images, respectively;
    raising the relative contrast metric M to a power X where X>1;
    weighting the M to emphasize center pixels in the template window and de-emphasize edge pixels in the template window; and
    computing a running sum of the metric Nil as a cost;
  assigning the cost to the correlation surface for each template offset position.

13. The computer-implemented method of claim 11, wherein the first threshold is greater than zero and less than one to detect sub-pixel vehicle motion.

14. The computer-implemented method of claim 11, wherein the step of computing the FOM comprises for each said template window,
  resampling the pixel values within the template window of the first pseudo pan image or the search window of the second pseudo-pan image using the X and Y correlation offsets;
  correlating the template window in the first pseudo-pan image to a search window in the second pseudo-pan image to produce a resampled correlation surface; and
  computing the FOM from the resampled correlation surface.

15. The computer-implemented method of claim 14, wherein the FOM is computed as 1−A/B where B is a maximum value in the resampled correlation surface and A is a next highest value at least a radius R away from the location of the maximum value in the resampled correlation surface.

16. The computer-implemented method of claim 11, further comprising:
for remaining correlations, grouping pixels whose X and Y offsets exceed a threshold into the objects;
measuring a local contrast around candidate vehicles to reject the objects below a contrast threshold;
measuring a local contrast within candidate vehicles to split the objects with interior low contrast lines;
measuring a size and dimensions of the objects to reject the objects that exceed a specified size;
eroding objects to remove pixels around the objects;
dilating the objects to obtain more accurate centroid locations and more complete object definition;
outputting the remaining objects and their locations as moving vehicles.

17. The computer-implemented method of claim 11, further comprising:
for each detected moving vehicle, outputting its location, speed and heading with sub-pixel accuracy.

18. A computer-implemented method of automated road network identification, said computer programmed to implement the steps of:
receiving a single multi-band image including a first set of band images and a second set of band images collected with a time lag relative to the first set;
exploiting the time lag between the first and second sets to detect moving vehicles in the single multi-band image;
using the detected moving vehicles to extract pixel values from the single multi-band image at pixels adjacent to locations of detected moving vehicles to characterize at least one image-specific spectral roadway signature; and
searching the single multi-band image to match the at least one image-specific spectral roadway signature to pixel values for each of the bands for groupings including at least one pixel to grow a road network map, by, for each image-specific spectral roadway signature, selecting a subset of pixels from the multi-band image, computing a spectral similarity metric to each pixel in the subset, applying a threshold to the similarity metric for each pixel to create a binary-roadway map and analyzing the binary roadway map based at least in part on the headings of the detected moving vehicles to adjust and reapply the threshold to the similarity metric for each pixel to update the binary roadway map and then combining the binary roadway maps for all of the image-specific spectral roadway signatures to generate the road network map.

19. A computer-implemented method of automated road network identification, said computer programmed to implement the steps of:
receiving a single multi-band image including a first set of band images and a second set of band images collected with a time lag relative to the first set;
exploiting the time lag between the first and second sets to detect moving vehicles including their location, heading and speed in the single multi-band image;
using the detected moving vehicles to extract pixel values from the single multi-band image at pixels adjacent to locations of the detected moving vehicles to characterize at least one image-specific spectral roadway signature;
searching the single multi-band image to match the at least one image-specific spectral roadway signature to pixel values for each of the bands for groupings including at least one pixel to grow a road network map; and
using the speed and heading of the detected moving vehicles to label the road network map.

* * * * *

UNITED STATES PATENT AND TRADEMARK OFFICE
CERTIFICATE OF CORRECTION

| | | |
|---|---|---|
| PATENT NO. | : 11,941,878 B2 | Page 1 of 1 |
| APPLICATION NO. | : 17/358850 | |
| DATED | : March 26, 2024 | |
| INVENTOR(S) | : Boroughs et al. | |

It is certified that error appears in the above-identified patent and that said Letters Patent is hereby corrected as shown below:

In the Specification

In Column 4, Line 57, delete "vehicles:" and insert --vehicles;-- therefor

In the Claims

In Column 13, Line 63, in Claim 1, delete "nets pork" and insert --network-- therefor In Column 14, Line 8, in Claim 1, after "by", insert --;--

In Column 14, Line 47, in Claim 5, after "comprises", insert --:--

In Column 15, Line 12, in Claim 8, after "by", insert --;--

In Column 16, Line 7, in Claim 11, after "by", insert --;--

In Column 16, Lines 21-22, in Claim 11, delete "identity" and insert --identify-- therefor In Column 16, Line 47, in Claim 12, delete "Nil" and insert --M-- therefor Signed and Sealed this
Thirty-first Day of December, 2024

Derrick Brent
*Acting Director of the United States Patent and Trademark Office*